Sept. 12, 1950          F. A. SIMON          2,522,309
ALLERGY TESTING INSTRUMENT
Filed Dec. 1, 1948
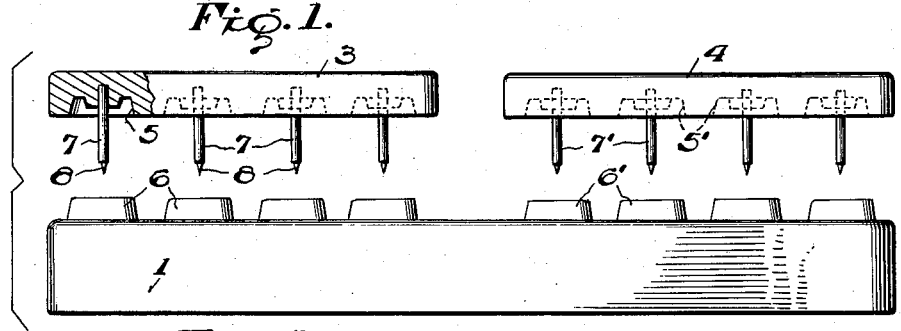
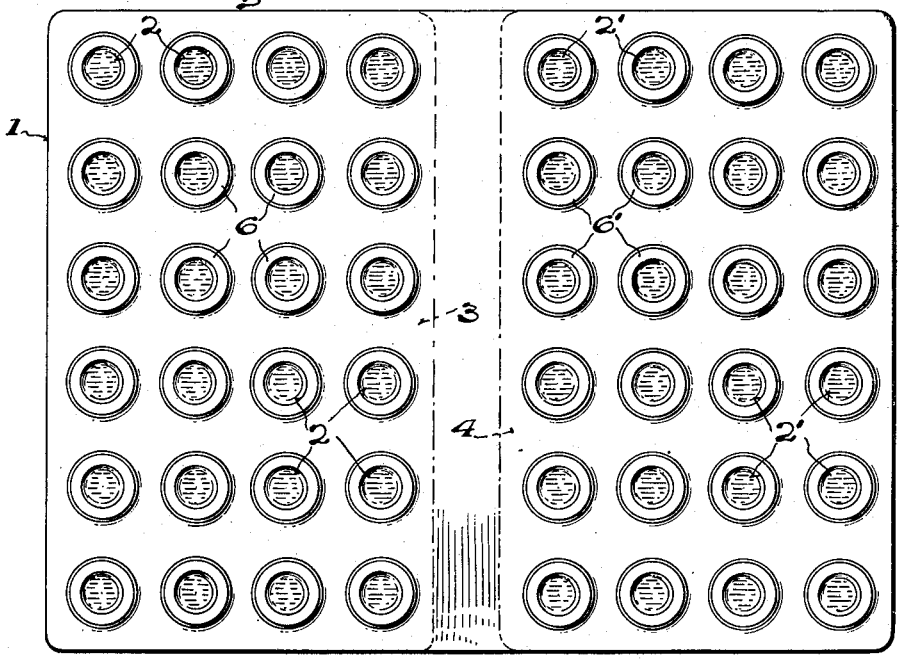
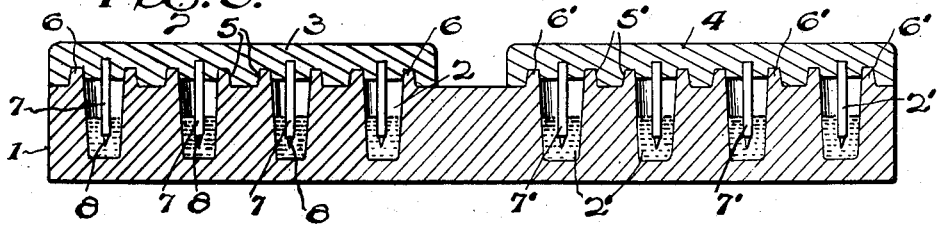
INVENTOR.
*Frank A. Simon.*
BY *Cameron, Kerkam + Sutton*
ATTORNEYS Patented Sept. 12, 1950

2,522,309

UNITED STATES PATENT OFFICE 2,522,309

ALLERGY TESTING INSTRUMENT

Frank A. Simon, Louisville, Ky.

Application December 1, 1948, Serial No. 62,891

2 Claims. (Cl. 128—2)

This invention pertains to an improved allergy skin testing instrument which has numerous advantages over instruments presently in use.

It is usual in testing a subject for allergy to apply a drop or drops of an allergen to the surface of his skin and to then scratch the surface of the skin through the drop with an appropriate needle or other sharp instrument to allow subcutaneous or intracutaneous penetration of the allergenic extract. It has been suggested previously to apply a series of droplets of various allergens to a skin surface and to then scratch the surface of the skin through the droplets in an attempt to determine whether or not the subject is allergic to one or more of the substances so introduced. This method has numerous disadvantages. A complete course of tests covering the range of possibilities consumes a great deal of time and causes the subject considerable discomfort. Furthermore, inaccuracies and faulty results sometimes occur due to careless clinical work.

It is therefore the primary object of the present invention to provide an instrument with which a subject may be tested for allergy by simultaneous inoculation with a number of allergenic extracts in one operation.

It is a further object of the invention to eliminate possibility of mistakes present in the current methods of testing for allergies.

It is a further object of this invention to reduce the time factor involved in such tests to a fraction of that involved at present.

It is a further object of this invention to increase the efficiency of such tests and to enable a number of tests to be made in a relatively short period of time.

Other and further objects of this invention will become apparent as this specification proceeds.

Referring to the drawings:

Fig. 1 is an end view, partially in section, of the novel instrument;

Fig. 2 is a top plan view of the base of the instrument; and

Fig. 3 is a cross section view of the instrument with the covers in place over the wells.

In the drawings, 1 indicates a preferably substantially rectangular base member formed of plastic, hard rubber or other suitable material. As shown, base 1 is appropriately recessed to contain preferably forty-eight substantially cylindrical wells 2 and 2' arranged in two groups of twenty-four each. Wells 2 and 2' are preferably disposed laterally at a distance of substantially one inch apart, from center to center, and are rectangularly aligned as shown in six groups of four each. The left-hand group of twenty-four wells 2 is designed to hold twenty-four different allergenic extracts, for example, ragweed pollen, feathers, eggs, and other allergens with which it is desired to test the subject. Each well is preferably filled approximately half full of the desired extract. The group of twenty-four wells 2' disposed in the right section of base 1 is designed for sterilization and each well contains a pledget of cotton saturated with an antiseptic such as alcohol, diluted phenol or merthiolate.

Covers 3 and 4 are designed to fit closely over each series of wells 2 and 2' disposed in base 1. Covers 3 and 4 are appropriately recessed as at 5 and 5' to closely fit over and stopper the flanges 6 and 6' of wells 2 and 2'. Covers 3 and 4 may be appropriately formed of plastic, hard rubber or any other desired material. Stainless steel needles 7 and 7' are appropriately cemented or otherwise fixedly mounted in the centers of recesses 5 and 5' and are disposed at right angles to the lower faces of covers 3 and 4. Each of needles 7 and 7' carries at its extremity a sharpened, shouldered point 8. When not in use points 8 of needles 7 carried by cover 3 are submerged in the twenty-four allergens in wells 2 disposed in the left-hand section of base 1. Needles 7' carried by cover 4 remain submerged in the antiseptic carried by wells 2' disposed in the right-hand section of base 1.

A chart showing the type of allergenic extract contained in each of the wells 2 should be kept at hand for reference and record, or if desired the wells 2 and cover 3 may be appropriately labeled with the names of the allergenic extracts contained in each of the individual wells 2.

The instrument as shown in the drawings comprises a rectangular flat base member carrying two series of twenty-four wells, the covers carrying twenty-four corresponding needles. If desired, the shape of the base and covers may be changed to oval or round, or the device may be elongated to fit any desired portion of the anatomy. In addition, the device may be appropriately curved to fit a curved portion of the anatomy and the number of wells and needles may be varied at will to meet any requirements. The two covers may be made integral, if desired. The dimensions of the parts of the instrument may be varied as desired.

The new instrument is used as follows:

At the beginning of the test, covers 3 and 4 carrying needles 7 and 7' are in position over wells 2 and 2' with each needle disposed in its proper well. Using the right hand, cover 3 is removed from wells 2 with spiral motion so that needles 7 will touch the sides of wells 2 to remove excess allergenic extract. The points of needles 7 are then firmly applied in a perpendicular position to a flat surface of the skin of the subject to be tested, for example to the back. The needles may also be applied perpendicularly with a slight twisting motion to follow the surface contour on a curved surface, for example, the arm, forearm or thigh. In either instance points 8 of needles 7 will penetrate the surface of the epidermis to the same depth, excessive penetration being prevented by the shoulder provided at the base of points 8. Penetration and inoculation with the allergenic extracts having been completed, cover 4 is raised from antiseptic wells 2' with the left hand and cover 3 is placed over wells 2' to be sterilized, cover 4 carrying sterile needles 7' being placed in position over allergen wells 2 in preparation for the next test. It will be noted that each needle point 8 is sterilized in its own individual well 2', which individual sterilization prevents contamination and mixing of allergenic extracts. It is preferred that each of the needles 7 and 7' be identified by a number, i. e., Series No. 1, Series No. 2, etc., which numbers should at all times be kept in an upright position to prevent reversal of covers 3 and 4 and mixing of extracts.

The dimensions of the instrument shown in the drawings may be as follows, though these dimensions may be varied as desired, without departing from the spirit of this invention: Base 1, 9¼" x 6¼" x 1⅛"; wells 2 and 2', ⅞" in depth, top diameter ½", bottom diameter ⅜"; covers 3 and 4, 6¼" x 4½" x ½"; needles 7 and 7', ⅞" in length, ⅛" in diameter; points 8 and 8', 1/16" in length.

In all allergy testing techniques previously followed the tests are performed singly. The present instrument is the first multiple allergy tester devised. In addition to its numerous other advantages it prevents unequal penetration of the skin by the needles. Tests heretofore have employed the "scratch," "puncture," or "intracutaneous" techniques in each of which the skin has been penetrated to various depths, the depth of penetration being completely out of control of the operative giving the test. With the present instrument excess penetration is prevented by the shoulders above the points 8 and 8' and all perforations of the skin are of the same depth. This insures a uniformity of result impossible with old methods.

In addition, when the old techniques were utilized tests were frequently made in the wrong order, they were accidently repeated and frequently omitted by busy or over-worked technicians. With the present device the tests are applied in the same order in which the extracts are arranged in the wells 2 and thus errors in sequence of tests are impossible. With it a large number of allergy tests can be given in a matter of seconds which would have required several hours of painstaking work under the old method. This results in a great saving of time and requires the services of fewer technicians and less clinical space. In addition, the tests are always uniform.

With the new method all pain incident to the testing is over in a few seconds, whereas with the old individual scratch methods the pain was continued intermittently over a period of hours. For this reason the device is particularly well adapted to the testing of children for various allergies.

The device is particularly designed for performing skin tests with the extract of various pollens, fungi, other inhalant substances, food, bacteria, and drugs. It is also useful in the diagnosis and determination of the causes of bronchial asthma, hay fever, eczema, urticaria, gastrointestinal allergies, angioneurotic edema and other allergic conditions. It may also be used for the Dick test, Schick test, etc., which give information regarding susceptibility to scarlet fever and diphtheria. In addition, it may be used in tests for infestation with intestinal parasites or for infestation with non-intestinal parasites. It may be used for all cutaneous tests.

The present invention is susceptible of numerous embodiments and uses. The embodiment shown in the drawings is by way of illustration only. The shape and dimensions of the instrument and the number of wells and needles utilized may be varied as required. Nothing in this specification is intended to limit the scope of the invention or the range of equivalents which may be used in this combination. Attention is directed to the appended claims for the limitation of its scope.

What is claimed is:

1. In an allergy testing instrument, a base, a series of wells in said base designed to receive allergenic extracts, a second series of wells in said base containing an antiseptic, a cover for said base and a series of needles mounted in the underside of said cover and extending downwardly therefrom designed to penetrate said wells.

2. In an allergy testing instrument, a base, a series of walls containing allergenic extracts disposed equidistant from each other in said base, a second series of equidistant wells in said base containing an antiseptic, a cover for said base adapted to seal said wells and a series of needles mounted in the underside of said cover and extending downwardly therefrom to penetrate said wells when said cover is in place.

FRANK A. SIMON.

REFERENCES CITED

The following references are of record in the file of this patent:

UNITED STATES PATENTS

| Number | Name | Date |
| --- | --- | --- |
| 616,042 | Walsh | Dec. 13, 1898 |
| 724,522 | Thomas | Apr. 7, 1903 |
| 866,995 | Wright | Sept. 24, 1907 |
| 2,190,745 | Vollmer | Feb. 20, 1940 |
| 2,301,567 | Morse | Nov. 10, 1942 |